United States Patent [19]

Record et al.

[11] Patent Number: 5,372,824
[45] Date of Patent: Dec. 13, 1994

[54] MINT FLAVORED CHEWING GUM HAVING REDUCED BITTERNESS AND METHODS FOR MAKING SAME

[75] Inventors: David Record, River Forest; Henry Tyrpin, Midlothian; Kevin Broderick, Berwyn; Sonya Johnson, Brookfield, all of Ill.

[73] Assignee: The Wm. Wrigley Jr. Company, Chicago, Ill.

[21] Appl. No.: 37,037

[22] Filed: Mar. 25, 1993

[51] Int. Cl.⁵ ............................................ A23G 3/30
[52] U.S. Cl. ..................................... 426/3; 426/534; 426/651
[58] Field of Search ............................. 426/3–6, 426/651, 534

[56] References Cited

U.S. PATENT DOCUMENTS

| | | | |
|---|---|---|---|
| 4,613,513 | 9/1986 | Hussein | 426/651 |
| 4,708,880 | 11/1987 | Hussein | 426/651 |
| 4,724,151 | 2/1988 | Mansukhani | 426/3 |
| 4,889,726 | 12/1989 | Dave et al. | 426/3 |
| 4,948,595 | 8/1990 | Patel et al. | 426/3 |
| 4,980,169 | 12/1990 | Oppenheimer et al. | 424/439 |
| 5,030,459 | 7/1991 | Barcelon et al. | 426/3 |
| 5,041,294 | 8/1991 | Patel | 426/3 |
| 5,047,251 | 9/1991 | Spencer | 426/3 |
| 5,165,943 | 11/1992 | Patel et al. | 426/3 |
| 5,204,128 | 4/1993 | Johnson | 426/3 |

FOREIGN PATENT DOCUMENTS

WO90/06689  6/1990  WIPO .
WO91/05457  5/1991  WIPO .

*Primary Examiner*—Jeanette Hunter
*Attorney, Agent, or Firm*—Hill, Steadman & Simpson

[57] ABSTRACT

A mint flavored chewing gum having reduced bitterness comprising a water insoluble base portion, a water soluble portion, and a mint flavor agent from which at least a portion of 1-menthol has been removed. In an embodiment, the mint flavored chewing gum includes a cooling agent. Additionally, a method of adding mint flavor to a chewing gum and reducing bitterness associated with such flavor is provided. The method comprises the step of removing at least a portion of 1-menthol present in the mint flavor before adding the mint flavor to other components of the chewing gum.

20 Claims, 3 Drawing Sheets

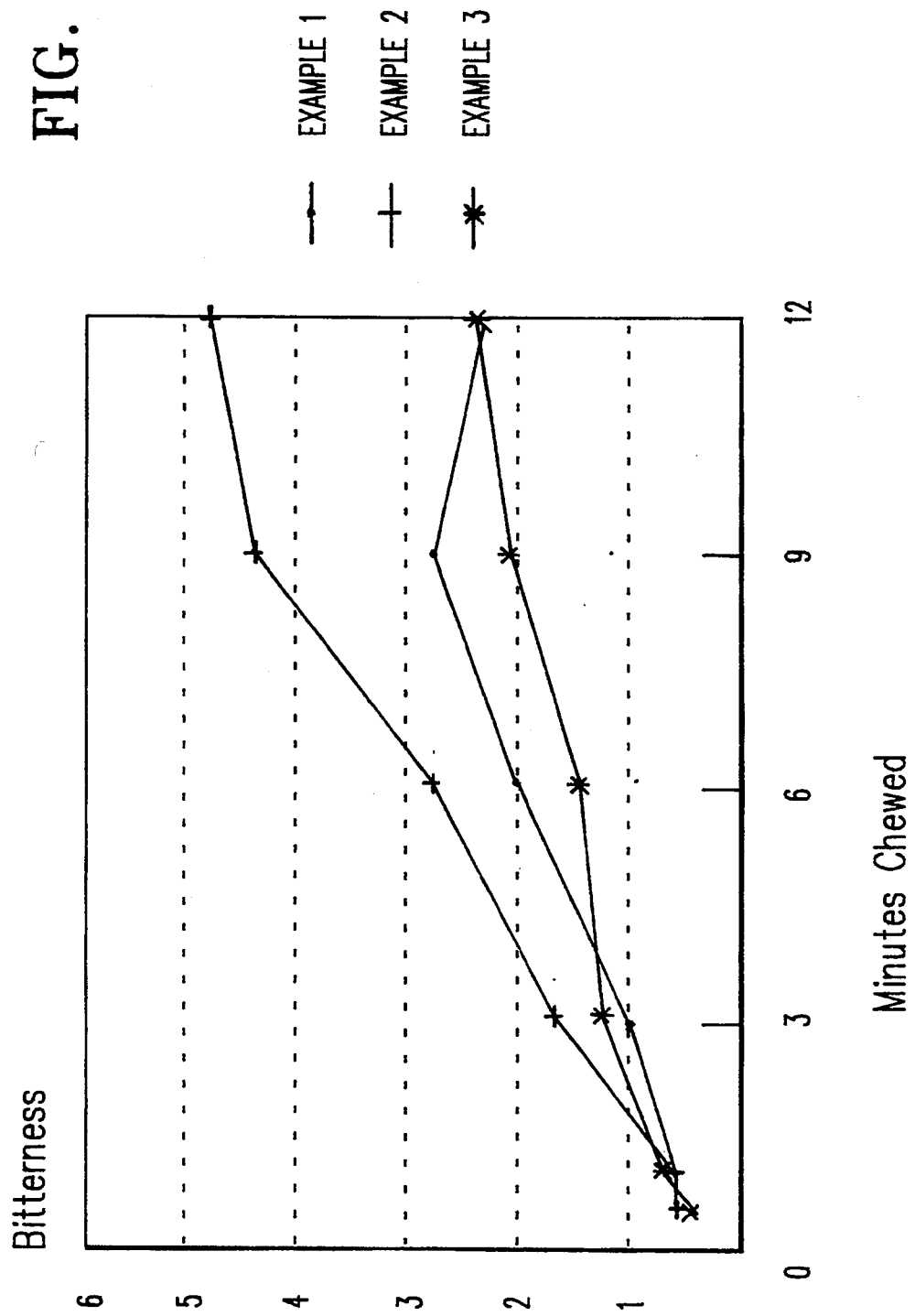

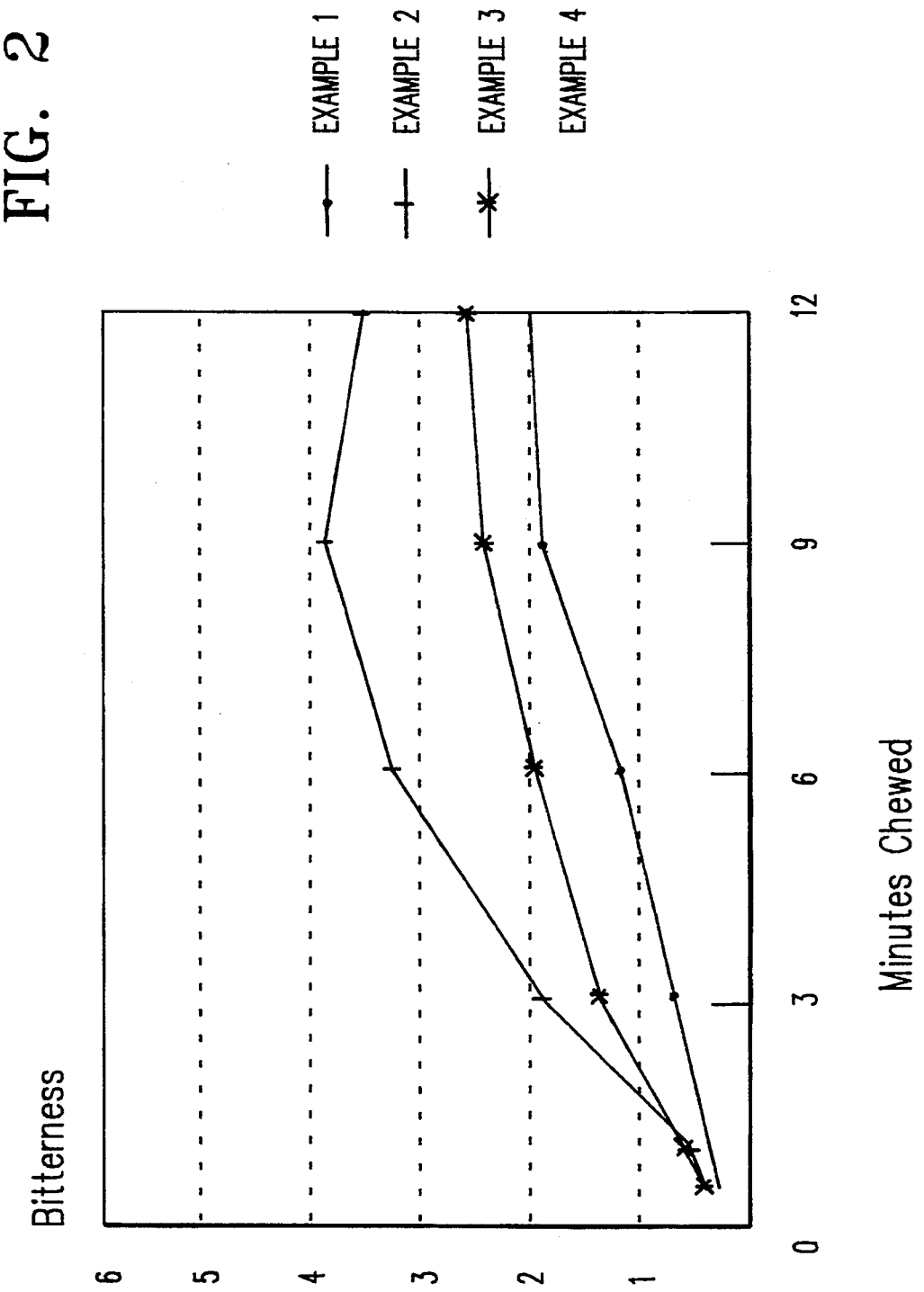

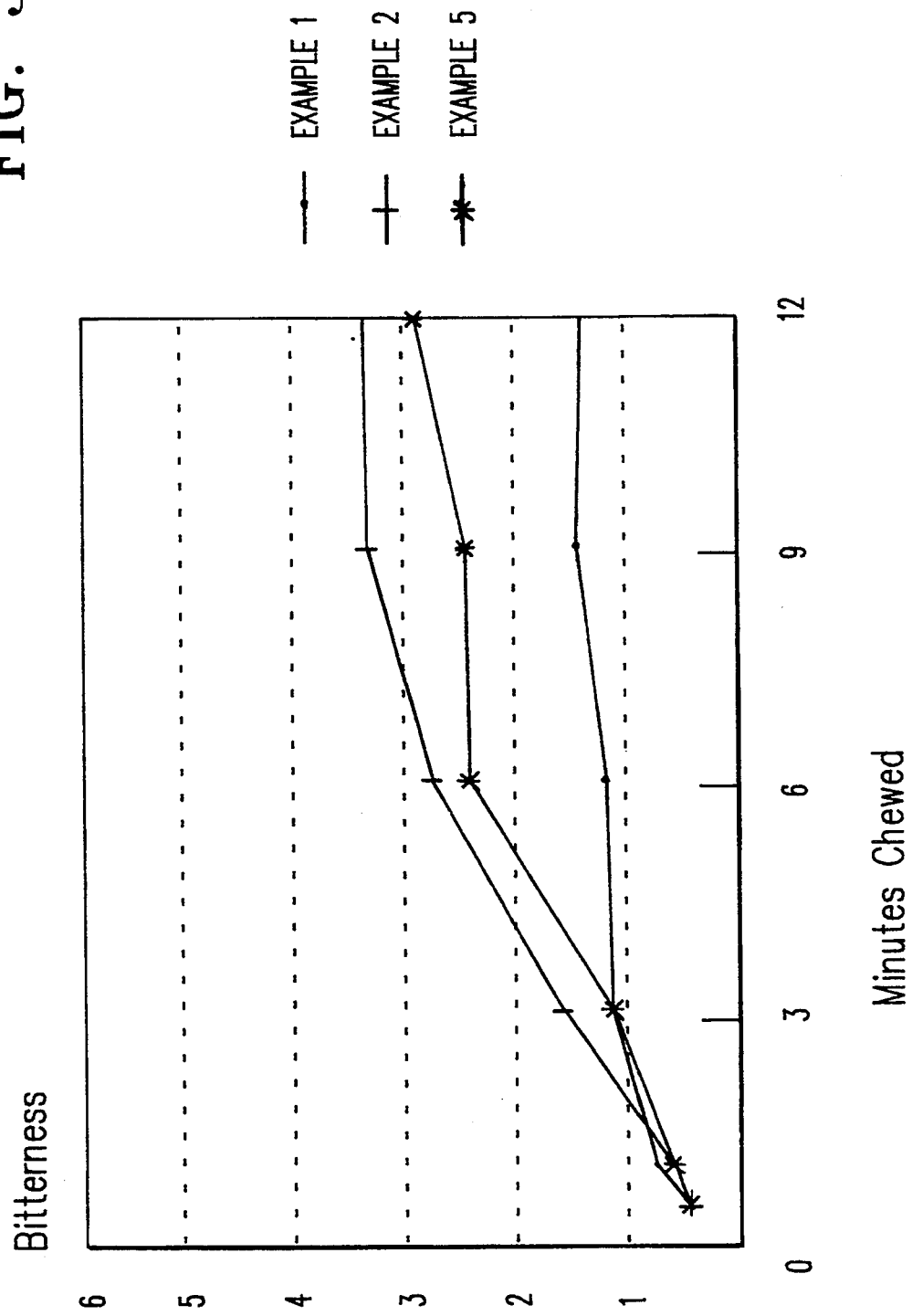

MINT FLAVORED CHEWING GUM HAVING REDUCED BITTERNESS AND METHODS FOR MAKING SAME

BACKGROUND OF THE INVENTION

The present invention relates generally to chewing gums. More specifically, the present invention relates to mint flavored chewing gums.

It is known in the chewing gum industry to add mint flavoring to chewing gum. For example, it is known to add peppermint oil to chewing gum. In addition to adding desirable taste characteristics to the chewing gum, such mint flavoring can add perceived breath freshening properties.

Mint flavored chewing gums, however, have a tendency to produce bitter flavor notes in the later part of a chew. This is due, in part, to the fact that most, if not all, of the sweetness properties have been dissipated. This causes more of the mint flavor to become apparent, as well as the bitterness.

In the chewing gum art, a number of formulations and combinations have been utilized to enhance the flavor of gum using mint flavors as well as to deal with some of the undesirable properties of mint flavoring.

For example, U.S. Pat. No. 4,948,595 relates to a method of enhancing the flavor of peppermint flavored chewing gum. Pursuant to the method, a minor amount of spearmint flavor and methyl salicylate are added.

U.S. Pat. No. 4,889,726 discloses non-chocolate flavored, mint flavored chewing gum. The gum, however, includes a minute amount of cocoa powder to enhance the mint flavor.

U.S. Pat. No. 5,041,294 relates to a spearmint flavored chewing gum. To reduce harshness, the flavor oil is treated with alditol.

U.S. Pat. No. 5,128,154 discloses a method of manufacturing a wintergreen flavored chewing gum. To remove undesirable off notes, the flavor is washed with an alkaline solution.

U.S. Pat. No. 4,708,880 discloses mint oil treated with a peroxide acid reagent. The treatment allegedly removes harsh flavor off notes.

U.S. Pat. No. 4,980,169 relates to the reduction of bitterness. The reduction is allegedly achieved by the addition of the oleoresin form of capsicum.

U.S. Pat. No. 4,613,513 relates to essential oils, such as mint oils that are treated with Fehlings' solution to remove harsh flavor off notes.

PCT 90-006689 discloses a mint flavored chewing gum. A prolonged flavor perception is provided by the addition of a minor amount of a spice ingredient.

PCT 91-005457 discloses a method of making chewing gum. Pursuant to the method, methyl salicylate is used so that the chewing gum is free of off notes.

Despite these attempts at creating improved chewing gum including mint flavors, and methods for making same, there still remains a need for a chewing gum including mint flavor and having reduced bitterness as well as methods for making same.

SUMMARY OF THE INVENTION

The present invention provides a mint flavored chewing gum having reduced bitterness. Moreover, the present invention provides methods for making mint flavored chewing gums having reduced bitterness.

To this end, the present invention provides a mint flavored chewing gum having reduced bitterness comprising a water insoluble base portion, a water soluble portion, and a mint flavor agent from which at least a portion of 1-menthol has been removed.

In an embodiment, the mint flavored chewing gum includes a cooling agent.

In an embodiment, the mint flavored chewing gum includes a cooling agent chosen from the group consisting of: menthyl lactate; N-ethyl-p-menthane-3-carboxamide; 3-1-menthoxypropane-1,2,diol; and menthone glycerol ketal.

In an embodiment, the mint flavored chewing gum includes approximately 0.1% to about 15.0% by weight mint flavor.

The present invention also provides a method of adding mint flavor to a chewing gum and reducing bitterness associated with such flavor. The method comprises the step of removing at least a portion of 1-menthol present in the mint flavor before adding the mint flavor to other components of the chewing gum.

In an embodiment of the method, the mint flavor includes peppermint or spearmint oil.

In an embodiment of the method, at least 25% of the 1-menthol originally present in the mint flavor is removed.

In an embodiment of the method, sufficient 1-menthol is removed from the mint flavor so that the resultant mint flavor that is added to the other chewing gum components is substantially free of 1-menthol.

In a preferred embodiment of the method, the portion of 1-menthol is removed from the mint flavor through a distillation process. Preferably, the portion of 1-menthol is removed by distilling the mint flavor into three fractions, a top fraction, a middle fraction containing 1-menthol, and a bottom fraction, and removing at least a portion of the middle fraction containing 1-menthol.

In an embodiment of the method, the method includes the step of adding a cooling agent to the other gum components.

Additionally, the present invention provides a method for making a chewing gum having a mint flavor comprising the steps of providing a mint oil having a 1-menthol content, reducing the 1-menthol content of the mint oil to create a mint flavor with reduced bitterness, and adding the mint oil with reduced bitterness to other components of the chewing gum.

It is an advantage of the present invention to provide a chewing gum having mint flavor, but having reduced bitterness as compared to other mint flavored chewing gums.

A further advantage of the present invention is to provide a method for making a chewing gum having mint flavor, but having reduced bitterness.

Still further, an advantage of the present invention is to provide a method for providing a mint flavored chewing gum having reduced bitterness without the requirement of adding additional components to the chewing gum to offset any bitter notes.

Moreover, an advantage of the present invention is to provide a mint flavor that does not have a tendency to produce bitter flavor notes in chewing gum.

Additionally, an advantage of the present invention is to provide an improved mint flavored chewing gum.

Further, an advantage of the present invention is to provide an improved method for making mint flavored chewing gum.

Additional features and advantages of the present invention are described in, and will be apparent from, the detailed description of the presently preferred embodiments and from the drawings.

BRIEF DESCRIPTION OF THE FIGURES

FIG. 1 illustrates, in graphic form, a comparison of bitterness reduction between typical peppermint flavored chewing gum and chewing gum constructed pursuant to the present invention graphing bitterness versus minutes chewed.

FIG. 2 illustrates a further graphic comparison of bitterness reduction using mint flavored chewing gums prepared pursuant to the present invention.

FIG. 3 illustrates a still further graphic comparison of bitterness reduction in mint flavored chewing gum constructed pursuant to the present invention.

DETAILED DESCRIPTION OF THE PRESENTLY PREFERRED EMBODIMENTS

The present invention provides improved mint flavored chewing gum and methods for making same. Pursuant to the present invention, a mint flavored chewing gum is provided that has reduced bitterness.

Of course, it should be appreciated that although in the preferred embodiments set forth herein, the methods are limited to the production of chewing gum, the present invention may have applications to the production of other mint flavored products, such as other mint flavored confectionery products.

One of the undesirable characteristics of mint flavor chewing gums is that in the latter part of a chew, once most or all of the sweetness is gone, the mint flavor becomes more apparent along with the bitterness. This bitterness is an undesirable characteristic in the chewing gum.

It is believed that the bitterness in such chewing gum is caused by l-menthol that is present in the mint flavor, and specifically in mint oils, such as, peppermint oil and spearmint oil. Menthol is not only responsible, the inventors believe, for bitterness, but is also responsible for the perceived breath freshening properties of mint flavored chewing gum. For example, peppermint flavor is known for its cooling and breath freshening properties. Of course, breath freshening properties in mint flavor chewing gum are a desirable characteristic.

Although the bitterness of the chewing gum can be reduced by simply reducing the percentage of, for example, peppermint flavor in a chewing gum formulation, this is not practical for some chewing gum formulations that require a higher flavor content. This is due, in part, to a strong desire of consumers to have chewing gum with more flavor.

Pursuant to the present invention, the bitterness in the mint flavored chewing gum is reduced/removed by reducing the l-menthol level within the mint flavor itself. This reduction does not unduly compromise the desirable properties sought by the mint flavor, but reduces or eliminates the bitterness- In order to compensate for any perceived loss of cooling or breath freshening properties, pursuant to the present invention, if desired, a cooling agent can be added.

Accordingly, pursuant to the present invention, a mint flavor chewing gum having reduced bitterness is provided comprising a water insoluble base portion, a water soluble base portion, and a mint flavor agent from which at least a portion of l-menthol has been removed. The chewing gum may be any of a variety of different chewing gums, including low or high moisture, sugar or sugarless, wax-containing or wax-free, low calorie and/or a chewing gum that includes dental health agents.

Chewing gum generally consists of a water insoluble gum base, a water soluble portion, and flavors. The water soluble portion dissipates with a portion of the flavor over a period of time during chewing. The gum base portion is retained in the mouth throughout the chew.

The insoluble gum base generally comprises elastomers, resins, fats and oils, softeners, and inorganic fillers. The gum base may or may not include wax. The insoluble gum base can constitute approximately 5 to about 95 percent, by weight, of the chewing gum, more commonly, the gum base comprises 10 to about 50 percent of the gum, and in some preferred embodiments, 20 to about 35 percent, by weight, of the chewing gum.

In an embodiment, the chewing gum base of the present invention contains about 20 to about 60 weight percent synthetic elastomer, 0 to about 30 weight percent natural elastomer, about 5 to about 55 weight percent elastomer plasticizer, about 4 to about 35 weight percent filler, about 5 to about 35 weight percent softener, and optional minor amounts (about one percent or less) of miscellaneous ingredients such as colorants, antioxidants, etc.

Synthetic elastomers may include, but are not limited to, polyisobutylene with a GPC weight average molecular weight of about 10,000 to about 95,000, isobutylene-isoprene copolymer (butyl elastomer), styrene-butadiene copolymers having styrene-butadiene ratios of about 1:3 to about 3:1, polyvinyl acetate having a GPC weight average molecular weight of about 2,000 to about 90,000, polyisoprene, polyethylene, vinyl acetate-vinyl laurate copolymer having vinyl laurate content of about 5 to about 50 percent by weight of the copolymer, and combinations thereof.

Preferred ranges are, for polyisobutylene, 50,000 to 80,000 GPC weight average molecular weight, for styrene-butadiene, 1:1 to 1:3 bound styrene-butadiene, for polyvinyl acetate, 10,000 to 65,000 GPC weight average molecular weight with the higher molecular weight polyvinyl acetates typically used in bubble gum base, and for vinyl acetate-vinyl laurate, vinyl laurate content of 10–45 percent.

Natural elastomers may include natural rubber such as smoked or liquid latex and guayule as well as natural gums such as jelutong, lechi caspi, perillo, sorva, massaranduba balata, massaranduba chocolate, nispero, rosindinha, chicle, gutta hang kang, and combinations thereof. The preferred synthetic elastomer and natural elastomer concentrations vary depending on whether the chewing gum in which the base is used is adhesive or conventional, bubble gum or regular gum, as discussed below. Preferred natural elastomers include jelutong, chicle, sorva and massaranduba balata.

Elastomer plasticizers may include, but are not limited to, natural rosin esters such as glycerol esters of partially hydrogenated rosin, glycerol esters polymerized rosin, glycerol esters of partially dimerized rosin, glycerol esters of rosin, pentaerythritol esters of partially hydrogenated rosin, methyl and partially hydrogenated methyl esters of rosin, pentaerythritol esters of rosin; synthetics such as terpene resins derived from alpha-pinene, beta-pinene, and/or d-limonene; and any suitable combinations of the foregoing. the preferred elastomer plasticizers will also vary depending on the specific application, and on the type of elastomer which is used.

Fillers/texturizers may include magnesium and calcium carbonate, ground limestone, silicate types such as magnesium and aluminum silicate, clay, alumina, talc, titanium oxide, mono-, di- and tri-calcium phosphate., cellulose polymers, such as wood, and combinations thereof.

Softeners/emulsifiers may include tallow, hydrogenated tallow, hydrogenated and partially hydrogenated vegetable oils, cocoa butter, glycerol monostearate, glycerol triacetate, lecithin, mono-, di-and triglycerides, acetylated monoglycerides, fatty acids (e.g. stearic, palmitic, oleic and linoleic acids), and combinations thereof.

Colorants and whiteners may include FD&C-type dyes and lakes, fruit and vegetable extracts, titanium dioxide, and combinations thereof.

The base may or may not include wax. An example of a wax-free gum base is disclosed in U.S. Ser. No. 07/906,921, the disclosure of which is incorporated herein by reference.

In addition to a water insoluble gum base portion, a typical chewing gum composition includes a water soluble bulk portion and one or more flavoring agents. The water soluble portion can include bulk sweeteners, high intensity sweeteners, flavoring agents, softeners, emulsifiers, colors, acidulants, fillers, antioxidants, and other components that provide desired attributes.

Softeners are added to the chewing gum in order to optimize the chewability and mouth feel of the gum. The softeners, which are also known as plasticizers and plasticizing agents, generally constitute between approximately 0.5 to about 15% by weight of the chewing gum. The softeners may include glycerin, lecithin, and combinations thereof. Aqueous sweetener solutions such as those containing sorbitol, hydrogenated starch hydrolysates, corn syrup and combinations thereof, may also be used as softeners and binding agents in chewing gum.

Bulk sweeteners include both sugar and sugarless components. Bulk sweeteners typically constitute 5 to about 95% by weight of the chewing gum, more typically, 20 to 80% by weight, and more commonly, 30 to 60% by weight of the gum.

Sugar sweeteners generally include saccharide-containing components commonly known in the chewing gum art, including, but not limited to, sucrose, dextrose, maltose, dextrin, dried invert sugar, fructose, levulose, galactose, corn syrup solids, and the like, alone or in combination.

Sugarless sweeteners include, but are not limited to, sugar alcohols such as sorbitol, mannitol, xylitol, hydrogenated starch hydrolysates, maltitol, and the like, alone or in combination.

High intensity artificial sweeteners can also be used, alone or in combination with the above. Preferred sweeteners include, but are not limited to sucralose, aspartame, salts of acesulfame, alitame, saccharin and its salts, cyclamic acid and its salts, glycyrrhizin, dihydrochalcones, thaumatin, monellin, and the like, alone or in combination. In order to provide longer lasting sweetness and flavor perception, it may be desirable to encapsulate or otherwise control the release of at least a portion of the artificial sweetener. Such techniques as wet granulation, wax granulation, spray drying, spray chilling, fluid bed coating, coacervation, and fiber extension may be used to achieve the desired release characteristics.

Usage level of the artificial sweetener will vary greatly and will depend on such factors as potency of the sweetener, rate of release, desired sweetness of the product, level and type of flavor used and cost considerations. Thus, the active level of artificial sweetener may vary from 0.02 to about 8%. When carriers used for encapsulation are included, the usage level of the encapsulated sweetener will be proportionately higher.

Combinations of sugar and/or sugarless sweeteners may be used in chewing gum. Additionally, the softener may also provide additional sweetness such as with aqueous sugar or alditol solutions.

If a low calorie gum is desired, a low caloric bulking agent can be used. Example of low caloric bulking agents include: polydextrose; Raftilose, Raftilin; Fructooligosaccharides (NutraFlora); Palatinose oligosaccharide; Guar Gum Hydrolysate (Sun Fiber); or indigestible dextrin (Fibersol). However, other low calorie bulking agents can be used.

A variety of flavoring agents can be used in combination with the mint flavor of the present invention. The flavor, which may only include the mint flavor, can be used in amounts of approximately 0.1 to about 15 weight percent of the gum, and preferably, 0.3 to 5%. Flavoring agents may include essential oils, synthetic flavors or mixtures thereof including, but not limited to, oils derived from plants and fruits such as citrus oils, fruit essences, peppermint oil, spearmint oil, other mint oils, clove oil, oil of wintergreen, anise and the like. Artificial flavoring agents and components may also be used. Natural and artificial flavoring agents may be combined in any sensorially acceptable fashion.

Pursuant to the present invention, the 1-menthol content of the mint flavor is reduced. Preferably, the 1-menthol is reduced in, for example, the peppermint oil by a distillation process. To this end, the peppermint oil or other mint oil can be distilled by a conventional vacuum distillation process. Vacuum distillation processes are known in the art and will allow, in the present invention, distillation of the mint oil to proceed on a production scale.

Through a vacuum distillation process, the peppermint oil will create three fractions: a top (or head) fraction; a middle (or heart) fraction; and a bottom (or tail) fraction. During vacuum distillation, the first approximate 30% of the mint oil taken off is the "head" fraction, the next approximate 65% is the "heart" fraction, and the last approximate 5% is the "tail" fraction. It has been found that the middle or heart fraction contains substantially all of the 1-menthol present in, for example, peppermint oil.

Pursuant to the present invention, at least a portion of the heart (middle) fraction is removed. Preferably, at least 25% of the 1-menthol content of the mint oil is removed before the flavor is used to construct a chewing gum. However, a lesser or greater amount of the 1-menthol can be removed. For example, if desired, substantially all of the 1-menthol can be removed.

By way of example, and not limitation, an example of mint flavor including peppermint oil modified pursuant to the present invention will now be given:

| Example of Modified Peppermint Flavor | Wt. Percent |
| --- | --- |
| Peppermint Oil Head Fraction | 28.27% |
| Peppermint Oil Main Fraction | 36.43 |
| Peppermint Oil Tail Fraction | 14.86 |
| Menthone | 14.38 |

| Example of Modified Peppermint Flavor | Wt. Percent |
|---|---|
| Menthyl Acetate | 1.92 |
| Artificial Peppermint Flavor | 2.50 |
| BHY | 1.09 |
| Spearmint Oil | 0.30 |
| Eucalyptus Oil | 0.25 |

With respect to the peppermint oil portion of the example set forth above, the ingredients of the peppermint oil pre- and post menthol reduction were as follows:

| Ingredients in Peppermint Fraction | Before Distillation (wt %) | After Menthol Reduction (wt %) |
|---|---|---|
| Eucalyptol/Limonene | 6.73 | 10.79 |
| Menthone | 23.16 | 26.74 |
| Isomenthone | 3.46 | 3.41 |
| Menthofuran | 1.75 | 3.91 |
| Neomenthol | 3.15 | 2.74 |
| Menthol* | 38.53 | 25.66 |
| Menthyl Acetate | 3.81 | 4.41 |
| Caryophyllone | 2.04 | 2.61 |
| Germacrine-D | 1.84 | 1.84 |

*There was a 33% reduction of menthol.

If desired, a cooling agent can be added to the mint oil that has been reduced with respect to its 1-menthol content. Examples of cooling agents include menthyl lactate, menthone glycerol ketal, 3-1-menthoxypropane-1,2,diol, and N-ethyl-P-menthane-3-carboxamide. The cooling agent can comprise, for example, 0.1% to 5.0% by weight of the reduced mint oil.

By way of further example, and not limitation, examples of possible flavors constructed pursuant to the present invention include:

| | wt. % |
|---|---|
| FLAVOR NO. 1 | |
| Peppermint Oil Head Fraction | 22.56 |
| Peppermint Oil Main Fraction | 38.49 |
| Peppermint Oil Tail Fraction | 15.52 |
| Menthone | 14.23 |
| Menthyl Acetate | 1.50 |
| Artificial Peppermint Flavor | 2.50 |
| BHT | 0.98 |
| Spearmint Oil | 0.29 |
| Eucalyptus Oil | 0.19 |
| Ethyl Alcohol | 0.42 |
| N-ethyl-p-menthane-3-carboximide | 3.32 |
| FLAVOR NO. 2 | |
| Peppermint Oil Head Fraction | 20.32 |
| Peppermint Oil Main Fraction | 42.53 |
| Peppermint Oil Tail Fraction | 17.15 |
| Menthone | 13.90 |
| Menthyl Acetate | 2.20 |
| Artificial Peppermint Flavor | 2.50 |
| BHT | 1.00 |
| Spearmint Oil | 0.30 |
| Eucalyptus Oil | 0.10 |
| FLAVOR NO. 3 | |
| Peppermint Oil Head Fraction | 23.47 |
| Peppermint Oil Main Fraction | 33.53 |
| Peppermint Oil Tail Fraction | 23.00 |
| Menthone | 16.20 |
| Menthyl Acetate | 2.50 |
| BHT | 0.90 |
| Eucalyptus oil | 0.40 |
| FLAVOR NO. 4 | |
| Peppermint Oil Head Fraction | 21.33 |
| Peppermint Oil Main Fraction | 40.79 |
| Peppermint Oil Tail Fraction | 15.24 |
| Menthone | 14.00 |
| Menthyl Acetate | 3.00 |
| BHT | 0.80 |
| Spearmint Oil | 0.40 |
| Eucalyptus Oil | 0.20 |
| Menthone Glycerol Ketal | 4.24 |
| FLAVOR NO. 5 | |
| Peppermint Oil Head Fraction | 21.09 |
| Peppermint Oil Main Fraction | 44.09 |
| Peppermint Oil Tail Fraction | 15.82 |
| Menthone | 13.42 |
| Menthyl Acetate | 1.44 |
| Artificial Peppermint Flavor | 2.50 |
| BHT | 1.09 |
| Spearmint Oil | 0.30 |
| Eucalyptus Oil | 0.25 |
| FLAVOR NO. 6 | |
| Peppermint Oil Head Fraction | 11.50 |
| Peppermint Oil Main Fraction | 12.46 |
| Peppermint Oil Tail Fraction | 8.63 |
| Menthone | 10.54 |
| Menthyl Acetate | 1.92 |
| Artificial Peppermint Flavor | 2.50 |
| BHT | 1.09 |
| Spearmint Oil | 0.30 |
| Eucalyptus Oil | 0.25 |
| Natural Peppermint Flavor | 50.81 |
| FLAVOR NO. 7 | |
| Peppermint Oil Head Fraction | 11.50 |
| Peppermint Oil Main Fraction | 12.46 |
| Peppermint Oil Tail Fraction | 8.63 |
| Menthone | 10.54 |
| Menthyl Acetate | 1.92 |
| Artificial Peppermint Flavor | 2.50 |
| BHT | 0.47 |
| Spearmint Oil | 0.30 |
| Natural Peppermint Flavor with BHT | 51.68 |
| FLAVOR NO. 8 | |
| Peppermint Oil Head Fraction | 22.59 |
| Peppermint Oil Main Fraction | 40.42 |
| Peppermint Oil Tail Fraction | 16.99 |
| Menthone | 14.08 |
| Menthyl Acetate | 1.82 |
| Artificial Peppermint Flavor | 2.60 |
| BHT | 0.90 |
| Spearmint Oil | 0.40 |
| Eucalyptus Oil | 0.20 |
| FLAVOR NO. 9 | |
| Peppermint Oil Head Fraction | 21.01 |
| Peppermint Oil Main Fraction | 43.53 |
| Peppermint Oil Tail Fraction | 14.28 |
| Menthone | 12.11 |
| Menthyl Acetate | 1.38 |
| Artificial Peppermint Flavor | 2.38 |
| BHT | 1.00 |
| Spearmint Oil | 0.25 |
| Ethyl Alcohol | 0.63 |
| Eucalyptus Oil | 0.28 |
| 3-1-menthoxypropane-1,2,diol | 3.15 |

By way of example, and not limitation, examples of the present invention compared to typical flavors will now be given:

EXAMPLE 1A

In the first experiment, peppermint oil was distilled and the middle or heart fraction was substantially removed so that the resultant peppermint oil had 30% reduced menthol as compared to the peppermint oil prior to the reduction. The reduction of the "heart" cut of the flavor was compensated for by replacing it with additional fractions of "head" and "tail." This flavor was then used in a gum formula at 1.35 weight percent of the total chewing gum formulation.

This flavor in a chewing gum was sensory tested against a chewing gum with 0.9% peppermint flavor without any reduction of menthol and a comparable gum with 1.35% peppermint flavor without a reduction of menthol. To this end, the gum samples were each chewed, for 12 minutes, by a group of trained sensory panelists to evaluate bitterness.

FIG. 1 illustrates the results of the sensory tests. The gum formulas that were used are set forth in Table 1. In Table 1, Example 1 is peppermint flavor at 0.9%; Example 2 is peppermint flavor at 1.35%; and Example 3 is modified flavor at 1.35%.

Although the experimental flavor was roughly equivalent to the 0.9% flavor, without any reduction of l-menthol in bitterness, it was much better than the comparative peppermint flavor at 1.35%. Of course, although equivalent to the 0.9% flavor in bitterness, the 1.35% flavor had 50% more peppermint oil and therefore, provides greater desirable sensory properties.

EXAMPLE 2A

In the second test, the above experiment was replicated but an additional sample with no menthol reduction, at 1.17% was tested. Again, the gums were chewed for 12 minutes by trained panelists.

The results which are set forth in FIG. 2 were similar to those for Example 1. But, the results demonstrated that the modified flavor at 1.35% was still less bitter than the comparative flavor at 1.17%. The gum formula using the comparative flavor with no menthol reduction at 1.17% is shown in Table 1 at Example 4.

EXAMPLE 3A

A third test was performed with chewing gums containing 0.9% flavor, 1.35% flavor, and an experimental flavor at 1.29%. The experimental flavor had the same menthol reduction as before (approximately 30%) only this time a cooling agent was added also to replace any cooling perception that might have been lost due to the menthol reduction.

The cooling agent used was N-ethyl-p-menthane-3-carboxamide (WS-3), obtained from Eastman Fine Chemicals. The gum formula using this flavor is shown in Table 1 at Example 5. The modified peppermint flavor at 1.29% including WS-3 used was as follows:

| Substance Name | Wt. % |
| --- | --- |
| Peppermint Oil Head Fraction | 20.4800 |
| Peppermint Oil Main Fraction | 42.7900 |
| Peppermint Oil Tail Fraction | 15.3600 |
| Menthone | 13.0400 |
| Menthyl Acetate | 1.4100 |
| Artificial Peppermint Flavor | 2.4400 |
| BHT | 1.0300 |
| Spearmint Oil | 0.2900 |
| Eucalyptus Oil | 0.2300 |
| Ethyl Alcohol | 0.5800 |
| N-Ethyl-p-Menthane-3-Carboxamide | 2.3500 |
| TOTAL: | 100.0000 |

Again, these three gums were chewed for 12 minutes by trained panelists. Test results are set forth in FIG. 3.

TABLE 1

| | Ex. 1 | Ex. 2 | Ex. 3 | Ex. 4 | Ex. 5 |
| --- | --- | --- | --- | --- | --- |
| Sugar | 54.83 | 51.297 | 51.297 | 51.477 | 51.357 |
| Base | 19.68 | 23.91 | 23.91 | 23.91 | 23.91 |
| Corn Syrup | 8.4 | 8.4 | 8.4 | 8.4 | 8.4 |
| Dextrose | 9.9 | 13.41 | 13.41 | 13.41 | 13.41 |
| Glycerin | 1.29 | 0.889 | 0.889 | 0.889 | 0.889 |
| Peppermint Flavor | 0.90 | 1.35 | — | 1.17 | — |
| Modified Peppermint Flavor | — | — | 1.35 | — | — |
| Modified Peppermint Flavor/WS-3 | — | — | — | — | 1.29 |
| Encapsulated Glycyrrhizin | — | 0.744 | 0.744 | 0.744 | 0.744 |

It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

We claim:

1. A mint flavored chewing gum having reduced bitterness comprising:
a water insoluble base portion;
a water soluble portion; and
a mint flavor agent including mint oil, that at least initially included l-menthol, the mint flavor agent having had a sufficient amount of the l-menthol removed to create a chewing gum that has reduced bitterness as compared to a chewing gum including the mint flavor agent from which no l-menthol has been removed.

2. The mint flavored chewing gum of claim 1 wherein at least 25% of the l-menthol originally present in the mint oil is removed.

3. The mint flavored chewing gum of claim including a cooling agent.

4. The mint flavored chewing gum of claim 3 wherein the cooling agent comprises approximately 0.1% to about 5.0% by weight of the mint flavor agent.

5. The mint flavored chewing gum of claim 1 including at least one cooling agent chosen from the group consisting of menthyl lactate; N-ethyl-p-menthane3-carboxamide;3-1-menthoxypropane-1,2,diol; and menthane glycerol ketal.

6. The mint flavored chewing gum of claim 1 including approximately 0.1% by weight to about 15.0% by weight peppermint oil.

7. A method of adding mint flavor to a chewing gum and reducing bitterness associated with such flavor comprising the step of removing at least a portion of l-menthol present in the mint flavor before adding the mint flavor to other components of the chewing gum.

8. The method of claim 7 wherein the mint flavor includes peppermint oil.

9. The method of claim 7 wherein at least 25% of the l-menthol originally present in the mint flavor is removed.

10. The method of claim 7 wherein sufficient l-menthol is removed so that the mint flavor added to the other components is substantially free of l-menthol.

11. The method of claim 7 wherein the portion of l-menthol is removed through a distillation process.

12. The method of claim 7 wherein the portion of l-menthol is removed by:
distilling the mint flavor into three fractions, a top fraction, a middle fraction, and a bottom fraction; and removing at least a portion of the middle fraction containing l-menthol.

13. The method of claim 7 including the step of adding a cooling agent to the other gum components.

14. A method for making a chewing gum having a mint flavor comprising the steps of:
providing a mint flavor having a l-menthol content:
reducing the l-menthol content of the mint flavor to create a mint flavor with reduced bitterness; and
adding the mint flavor with reduced bitterness to a water insoluble gum base and a water soluble gum portion to create a chewing gum.

15. The method of claim 14 wherein the mint flavor includes a peppermint oil.

16. The method of claim 14 wherein at least 25% of the l-menthol present in the mint flavor is removed.

17. The method of claim 14 wherein the portion of l-menthol is removed by using a distillation process.

18. The method of claim 14 wherein the portion of l-menthol is removed by:
distilling the mint flavor into three fractions, a top fraction, a middle fraction containing l-menthol, and a bottom fraction; and
removing at least a portion of the middle fraction containing l-menthol.

19. The method of claim 14 including the step of adding a cooling agent to the other gum components.

20. The method of claim 14 wherein additional top and bottom fractions are used to compensate for removal of the middle fraction.

* * * * *